April 4, 1961
T. ORDMAN
2,978,274
VISOR CONSTRUCTION
Filed Nov. 10, 1958
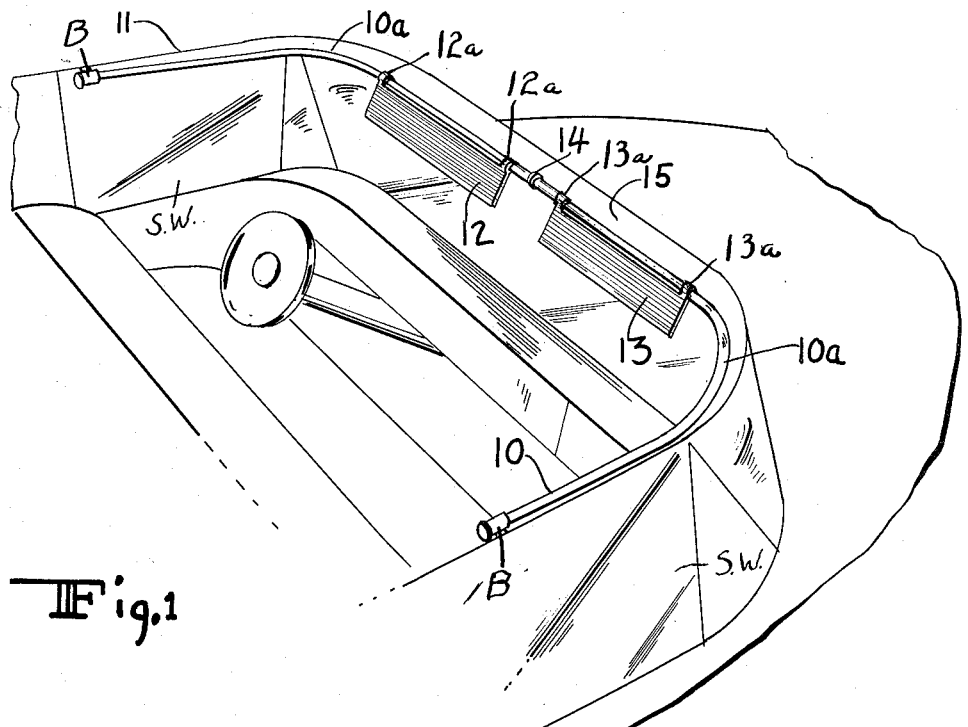
Fig. 1
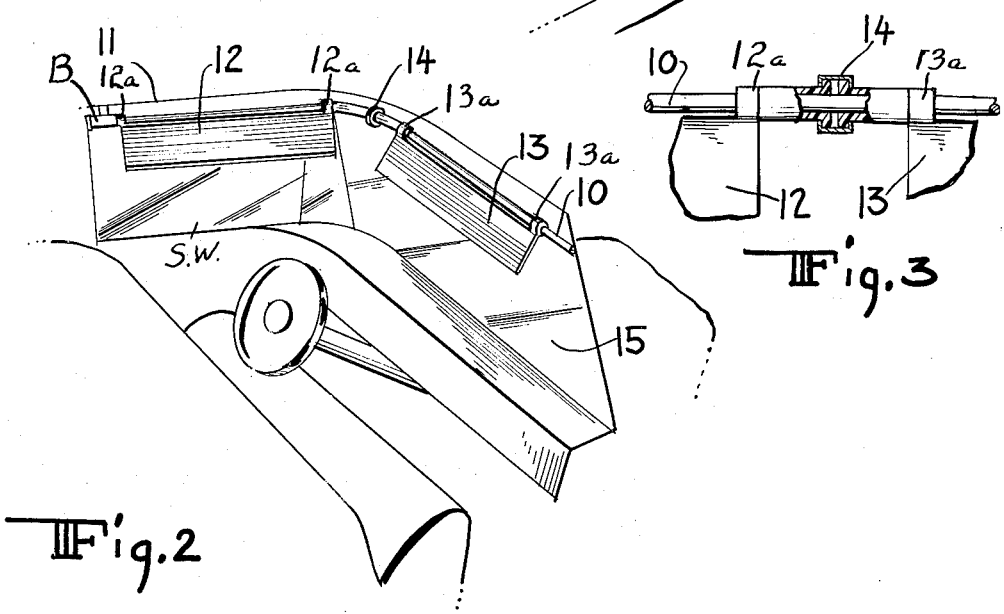
Fig. 2
Fig. 3
INVENTOR
Theodore Ordman
BY
Kenyon & Kenyon
ATTORNEYS

United States Patent Office 2,978,274
Patented Apr. 4, 1961

2,978,274

VISOR CONSTRUCTION

Theodore Ordman, Brooklyn, N.Y.
(Hunns Lake Road, Stanfordville, N.Y.)

Filed Nov. 10, 1958, Ser. No. 773,046

3 Claims. (Cl. 296—97)

This invention relates to sun visors for automotive vehicles.

It is conventional to equip the windshield of a motor car with two independently operable sun visors each separately swingable about horizontal and vertical axes from positions in front of the windshield to side positions as well as to inactive positions parallel with the ceiling or top of the car.

Frequently in driving the driver adjusts the windshield visor in front of him to a vertical plane blocking off the front view glare of the sun. In going around a curve he is required to swing the visor to the side to eliminate glare rays coming in via the side window and, upon return to a straight away must reshift the visor to its original position. Sometimes, the traffic conditions make it hazardous to remove his hands from the wheel to effect change over. Moreover, the visor to the right of the driver is useless to protect him from glare in rounding a curve and also is of no value to the passenger at his right when such turn is made. Moreover, on a winding road it becomes impractical to shift the visor with each turn in the road.

Objects and features of this invention are the provision of an improved type of visor which will eliminate the need for shifting during driving and provide effective glare protection for the driver and passenger to his right during conditions encountered in driving on curved roads.

Other objects and features of the invention are the provision of simple effective constructions for accomplishing these ends.

Further objects and features of the invention will become apparent from the following specification and the accompanying drawings, wherein:

Fig. 1 is an elevational fragmentary view of a motor car whose windshield is equipped with the visor of this invention;

Fig. 2 is a similar view in different position of the parts shown in Fig. 1; and Fig. 3 is an enlarged fragmentary section of the device.

In practising the invention a guide track or rail 10 is positioned as by brackets B above the top of the windshield frame 11 and this track is curved at 10a to provide a portion that extends parallel with the front side windows SW of the car. A pair of visors 12 and 13 at least, each independently swingable on the guide track 10 but, preferably coupled together at 14 for unitary movement along the guide track on suitable supports is provided. The mounting lugs 12a and 13a on the visors support the latter slidably and rotatably from rail 10. In normal use, the driver and passenger lower the visors 12 and 13 individually as desired to glare blocking positions in front of the windshield 15. Friction at the abutments between visor lugs 12a and 13a and the coupling member 14 retains the visors in adjusted glare blocking position. Rings internally of the coupling member assist in maintaining the visors in adjusted positions. On rounding a curve, to block off glare through the left side window, the driver simply shifts the visors 12 and 13 laterally to the left on the guide rail 10, bringing his visor 12 to the side window at the left and the passenger's visor 13 in front of the driver. On returning to straight away without moving the visors he still has a visor 13 blocking off glare coming in from the front. Later at leisure and during safe driving conditions he may return the two visors 12 and 13 to original position in front of the windshield. During drive in the shifted position the visor 13 in front of the driver protects the passenger from side glare. Moreover, if desired, a third visor (not shown) coupled to visors 12 and 13 in the same way as these two are coupled and similarly supported from rail 10 may be provided.

The visors themselves may be made of flexible material to permit easy shifting around the curved or bent guide rail 10. Various other ways of supporting the visors from the guide rail for easy shifting around its curved portions may be provided. If desired, the visors 12 and 13 need not be coupled together but may be shiftable independently on the guide rail.

Other structural modifications within the scope of the appended claims are contemplated. There is no intention of limitation to the exact details shown and described.

What is claimed is:

1. In combination, a guide rail having a front portion, side portion and curved portion joining the side portion to the front portion, flexible visors mounted to slide along any position of the guide rail and to be rotatable independently thereon, mounting lugs supporting the visors rotatably and slidably from the guide rail and in frictional engagement with the guide rail, and means between adjacent mounting lugs of different visors for coupling the visors to slide in unison along the guide rail, said coupling means being in frictional engagement with said adjacent mounting lugs.

2. In combination, a guide rail having a front portion, side portions and curved portions joining the side portions at the front portion, visors mounted to slide along any position of the guide rail and to be rotatable independently thereon, mounting members supporting the visors rotatably and slidably from the guide rail and in frictional engagement with the guide rail, and means between adjacent mounting members of different visors for coupling the visors to slide in unison along the guide rail, said coupling means being in frictional engagement with adjacent mounting members.

3. In combination a guide rail having a front portion, side portion and curved portion joining the side portion to the front portion, visors mounted to slide along any position of the guide rail and to be rotatable independently thereon, spaced mounting members supporting each of the visors rotatably and slidably from the guide rail and in frictional engagement with the guide rail, and means between adjacent mounting members of different visors for coupling the visors to slide in unison along the guide rail, said coupling means being in frictional engagement with said adjacent mounting member.

References Cited in the file of this patent

UNITED STATES PATENTS

| | | |
|---|---|---|
| 1,795,184 | Smith | Mar. 3, 1931 |
| 1,888,703 | Summerbell | Nov. 22, 1932 |
| 2,829,920 | Cohen | Apr. 8, 1958 |
| 2,855,241 | Walter | Oct. 7, 1958 |

FOREIGN PATENTS

| | | |
|---|---|---|
| 1,104,147 | France | June 8, 1955 |